United States Patent [19]

Spoerre et al.

[11] Patent Number: 5,602,761
[45] Date of Patent: Feb. 11, 1997

[54] MACHINE PERFORMANCE MONITORING AND FAULT CLASSIFICATION USING AN EXPONENTIALLY WEIGHTED MOVING AVERAGE SCHEME

[75] Inventors: Julie K. Spoerre; Chang-Ching Lin; Hsu-Pin Wang, all of Tallahassee, Fla.

[73] Assignee: Caterpillar Inc., Peoria, Ill.

[21] Appl. No.: 176,456

[22] Filed: Dec. 30, 1993

[51] Int. Cl.$^6$ .................................................. G01B 21/00
[52] U.S. Cl. .................... 364/554; 364/575; 364/551.01; 364/581
[58] Field of Search ................................. 364/184, 508, 364/581, 474.16, 141, 551.01, 551.02, 575; 340/679

[56] References Cited

U.S. PATENT DOCUMENTS

| | | | |
|---|---|---|---|
| 3,710,082 | 1/1973 | Sloane et al. | 364/508 |
| 4,803,736 | 2/1989 | Grossberg et al. | 382/22 |
| 4,914,708 | 4/1990 | Carpenter et al. | 382/14 |
| 5,040,214 | 8/1991 | Grossberg et al. | 381/43 |
| 5,133,021 | 7/1992 | Carpenter et al. | 382/15 |
| 5,142,590 | 8/1992 | Carpenter et al. | 382/14 |
| 5,157,738 | 10/1992 | Carpenter et al. | 382/15 |
| 5,210,704 | 5/1993 | Husseiny | 364/551.01 |
| 5,214,715 | 5/1993 | Carpenter et al. | 382/15 |

FOREIGN PATENT DOCUMENTS

| | | |
|---|---|---|
| 0244483B1 | 7/1992 | European Pat. Off. |
| WO9213306 | 8/1992 | WIPO |

OTHER PUBLICATIONS

Fukuda et al., "Alarm Reliability in Vibration Monitoring of Ball Bearing Seizure Du to A Lubrication Scarcity", Trans. Japan Soc. of Mechanical Eng. Part C v. 59 N. 560 Apr. 1993, Abstract.

Neter et al., Applied Statistics 3rd Ed., 1988 pp. 813–819, 857–889.

Carpenter et al., "Art 2: Self–Organization of Stable Category Recognition Codes for Analog Input Patterns," *Applied Optics*, vol. 26, No. 23, pp. 4919–4930, Dec. 1, 1987.

Carpenter et al., "Artmap: Supervised Real–Time Learning and Classification of Nonstationary Data by a Self–Organizing Neural Network," *Neural Networks*, vol. 4, pp. 565–588, 1991.

Huang et al., "Machine Fault Classification Using an ART 2 Neural Network," Nov. 1991, Accepted for International Journal of Advance Manufacturing Technology, May 1992.

Huang et al., "Artmap Neural Networks for Closed–Loop Welding Process Control," to appear in *Artificial Intelligence in Optimal Design and Manufacturing*, edited by Z. Dong, Oct. 1992.

Spoerre, Julie K., "Machine Performance Monitoring and Fault Classification Using an Exponentially Weighted Moving Average Scheme," Thesis, May 1993.

*Primary Examiner*—Emanuel T. Voeltz
*Assistant Examiner*—M. Kemper
*Attorney, Agent, or Firm*—Sterne, Kessler, Goldstein & Fox

[57] ABSTRACT

The present invention provides an accurate machine monitoring technique based on vibration analysis. An AR parametric model is generated to characterize a normal machine condition. Subsequently, data is collected from a machine during operation. This data is fit to the AR parametric model, and an Exponentially Weighted Moving Average (EWMA) statistic is derived therefrom. The EWMA statistic is able to identify whether the machine is in a normal state ("in control") or in an abnormal state ("out of control"). Additionally, an EWMA control chart is generated that distinguishes between normal and abnormal conditions, and between different abnormal conditions. As a result, once the EWMA statistic is generated, it is compared to the EWMA chart for determination of the specific fault that is ailing the machine.

5 Claims, 8 Drawing Sheets

Fig-2-

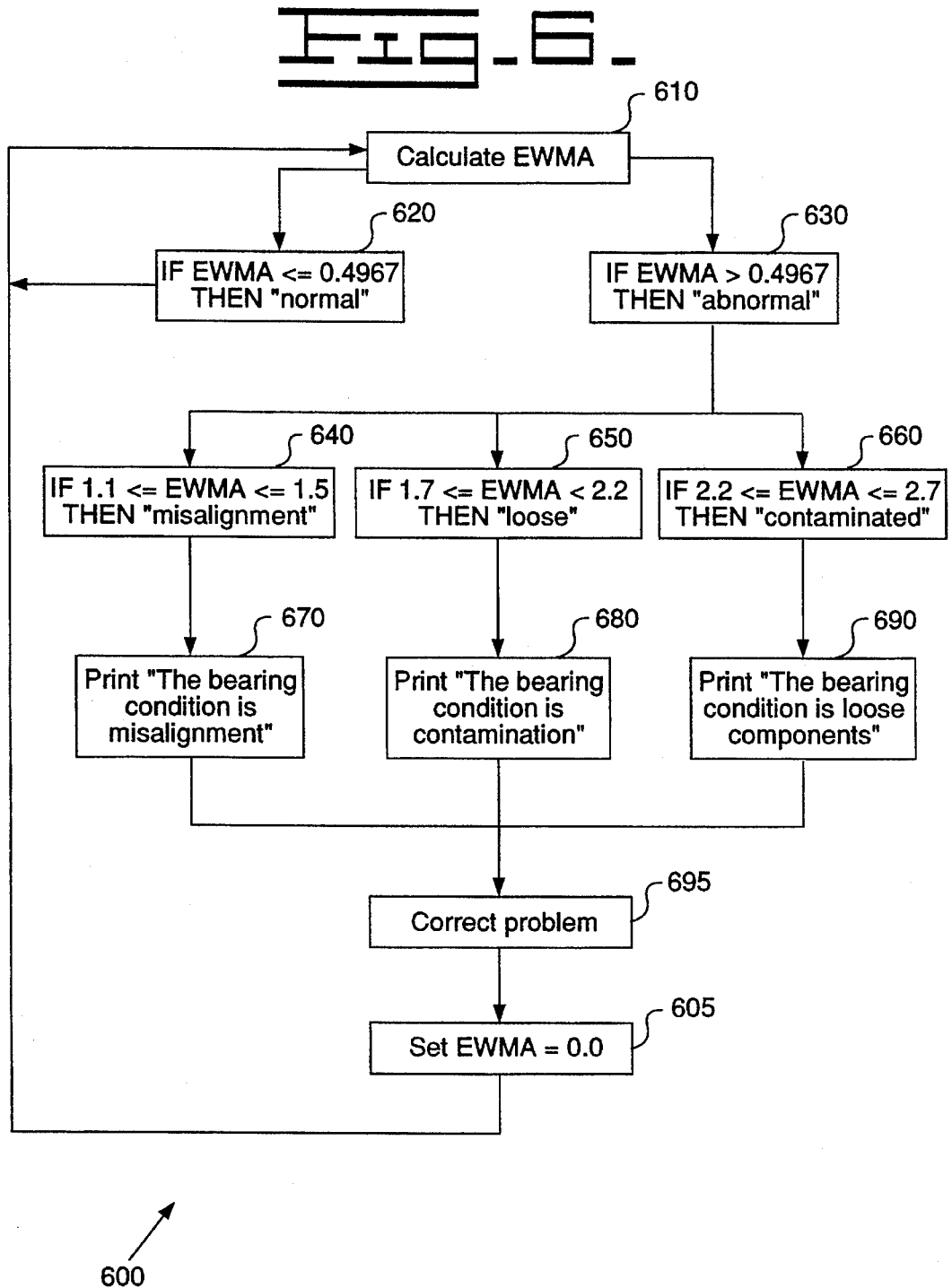

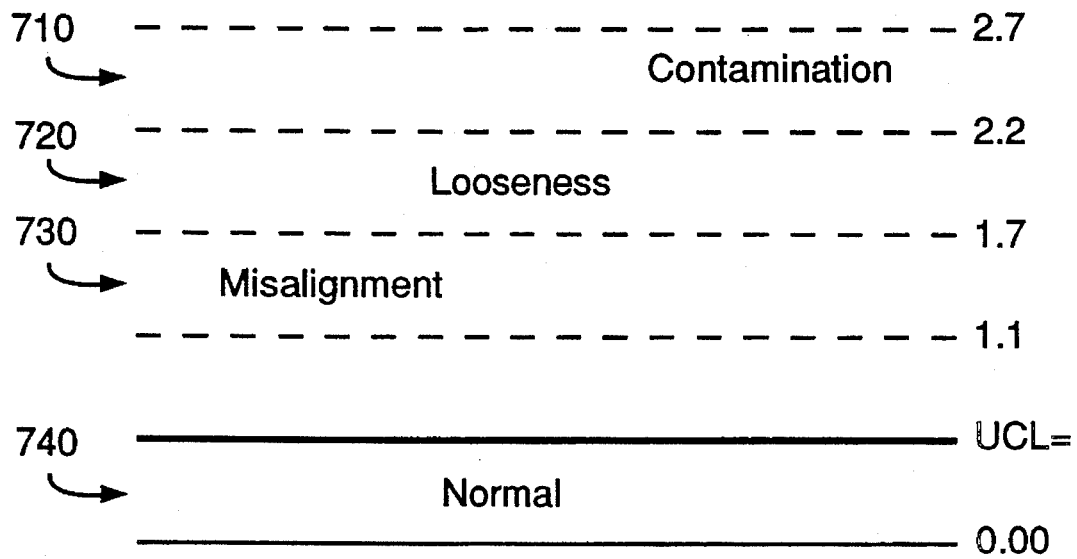
Fig_7_

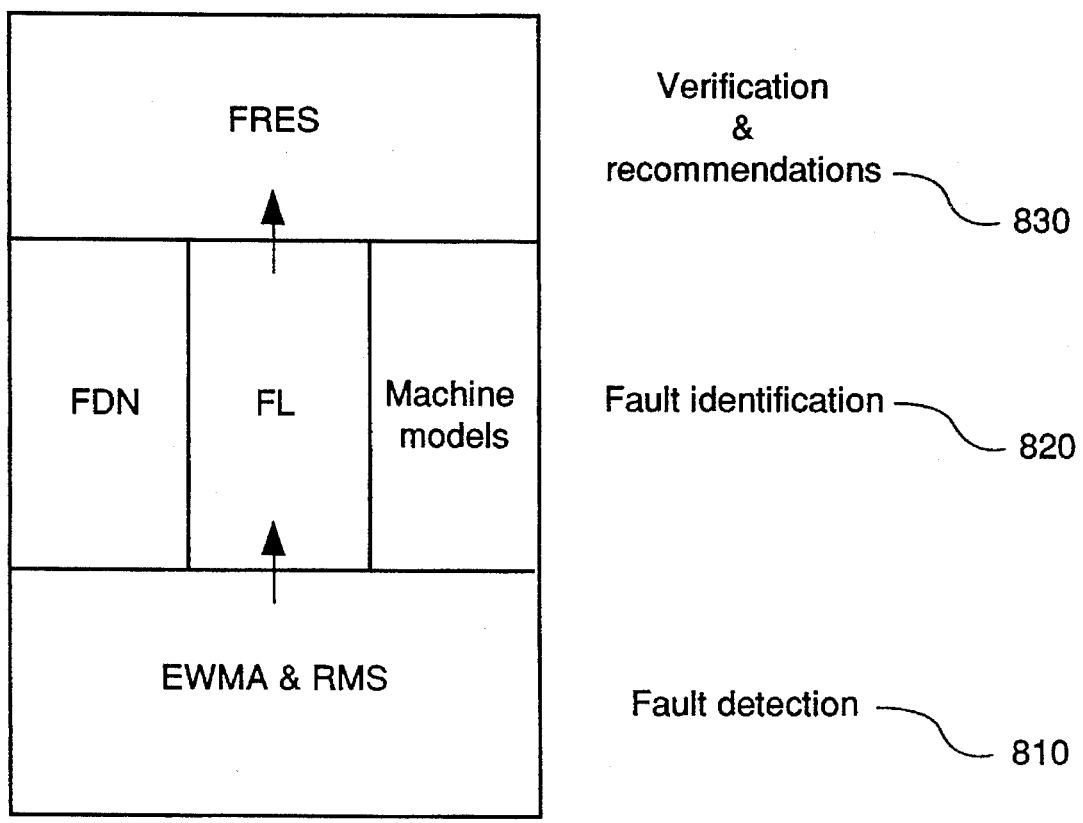

MACHINE PERFORMANCE MONITORING AND FAULT CLASSIFICATION USING AN EXPONENTIALLY WEIGHTED MOVING AVERAGE SCHEME

CROSS-REFERENCE TO CO-PENDING APPLICATIONS

The following applications are assigned to the assignee of the present application:

U.S. patent application entitled "Machine Fault Diagnostics System and Method," Ser. No. 08/176,482, now U.S. Pat. No. 5,860,092, naming as inventors Hsu-Pin Wang, Hsin-Hoa Huang, Gerald M. Knapp, Chang-Ching Lin, Shui-Shun Lin, and Julie M. Spoerre, filed concurrently herewith, the disclosure of which is hereby incorporated by reference in its entirety.

U.S. patent application entitled "Supervised Training of a Neural Network," Ser. No. 08/176,458, now U.S. Pat. No. 5,566,273, naming as inventors Hsin-Hoa Huang, Shui-Shun Lin, Gerald M. Knapp, and Hsu-Pin Wang, filed concurrently herewith, the disclosure of which is hereby incorporated by reference in its entirety.

BACKGROUND OF THE INVENTION

1. Field of the Invention

The present invention relates generally to the field of machine fault diagnostics and, more particularly, to a system and method of determining if a machine is operating in a normal state or an abnormal state.

2. Related Art

Over the past few decades industry has taken a variety of steps to improve productivity and quality. However, little attention has been given to the area of maintenance. Maintenance in a broad definition is concerned with controlling the condition of equipment. Although maintenance exists in virtually every manufacturing company, it is often considered to be a support function of a manufacturing process. Only in recent years has maintenance been recognized as an integral part of the manufacturing process, able to increase productivity and quality.

With the increased use of robots, automation, and more sophisticated machines in manufacturing processes, it might be more appropriate to say that productivity and quality depend on machines rather than the person who operates the machine. Robots, for example, have replaced human operators in tasks, such as assembly, loading and unloading, spot welding, and inspection. Keeping this sophisticated equipment in a satisfactory condition increases both the amount and complexity of maintenance. Hence, more repair time and more highly trained, high-priced maintenance technicians and engineers are needed. This, of course, translates to higher maintenance costs.

When the degree of automation increases, maintenance cost also increases. In many companies, maintenance costs represent one of the larger parts of total operating costs—often more than direct labor cost. Therefore, a maintenance strategy that effectively reduces maintenance cost is important for a modern industry to remain competitive.

The three most common maintenance strategies are breakdown or corrective maintenance (i.e., fix the machine when it fails), preventive or time-based maintenance (i.e., maintain machine based on scheduled time), and predictive or condition-based maintenance (i.e., maintain machine before it fails).

For many years, most manufacturing companies used either breakdown or preventive maintenance. In such a case, the machinery is either allowed to breakdown or routine maintenance is performed to reduce the risk of machine failures. Breakdown maintenance is suitable only when a machine is not important, and is inexpensive to replace. If the cost of lost production, potential secondary damage to machinery, and potential safety risks are high, then this strategy is unacceptable. An apparent improvement to this strategy is to use preventive maintenance.

Although preventive maintenance can reduce the occurrence of machine breakdown, it also has some problems. First, the period between overhauls is very difficult to determine because machines and their components do not fail at regular intervals. Second, precious production time is lost because it is prudent to examine as many components as possible during the overhaul period. Third, parts in reasonable condition are often replaced.

Therefore, the best strategy appears to be to adopt a predictive maintenance strategy which predicts the condition, performance, and reliability of machinery, so that maintenance can be planned in advance. Recently, due to the increasing requirement of product quality and manufacturing automation, more and more manufacturing companies have adopted predictive maintenance as part of their maintenance program. They are doing so in order to increase reliability, productivity, and availability while minimizing costs of maintenance and overall plant operation.

The goal of predictive maintenance is the elimination of machinery breakdowns by applying technologies to measure the condition of machines, identify any present or impending problems, and predict when corrective action should be performed. There are several benefits derived from predictive maintenance [see Pardue, E., et al., "Elements of Reliability-Based Machinery Maintenance," Sound and Vibration, May 1992, pp. 14–20].

First, the condition of machines under a predictive program is known, permitting repairs to be planned and carried out without interrupting production. Thus, maintenance work activities are more efficiently planned from the standpoint of workers, parts, and tools.

Second, product quality is improved. Product quality is often adversely affected by mechanically degraded equipment. Since quality is often measured as a final process step, large amounts of unacceptable quality product may be manufactured before the problem is detected. Predictive technologies can measure the mechanical condition of machinery so that corrections can be made before quality is compromised.

Third, safety is enhanced by eliminating unnecessary preventive maintenance work and eliminating extensive maintenance work resulting from catastrophic failure. Since maintenance activities are anticipated, planned, and carried out in a non-emergency environment, exposure to hazardous conditions is reduced.

Fourth, energy savings can be substantial. Since the elimination of high-energy vibration sources such as misalignment and imbalance can reduce machine power consumption by 10 to 15 percent, predictive maintenance provides several potential areas for energy savings.

Vibration data is the most widely used method for monitoring the condition of a machine due to its sensitivity and ability to provide early prediction of developing defects (see Serridge, M., "Ten Crucial Concepts Behind Trustworthy Fault Detection in machine Condition Monitoring," *Proceedings of the 1st International Machinery Monitoring and*

*Diagnostics Conference,* Las Vegas, Nevada, 19891, pp. 722–723). Although other process parameters (oil analysis, temperature, pressure, etc.) can be useful in giving early warning of machine breakdowns, they do not give as wide a range of fault types as vibration.

The suitability of vibration based analysis methods for machine health monitoring has been well documented. Vibration is known to provide the best and most comprehensive measure of machine condition compared with other measurement methods (See Angels, M., "Choosing Accelerometers for Machinery Health Monitoring," *Sound and Vibration,* December 1990, pp. 20–24). Vibration analysis allows the characterization of most of the dynamic solicitations in rotating machines, in particular those generated by abnormal running order. Furthermore, this method of analysis is easy to implement and efficient since machines remain running during the collection of vibration signals.

Vibration is directly correlated to machine longevity in two ways:

(1) A low vibration level when new a machine is new generally indicates that the machine Will last a long time (i.e., at or above its expected life).

(2) The vibration level increases when a machine is heading for a breakdown.

Using vibration data to improve maintenance operations is obtained by eliminating the purchase of unnecessary parts, doubling the life of the machinery, and decreasing energy consumption as a result of reducing the amount of noise and vibration generated.

Initiating a predictive maintenance program has a significant indirect benefit, in addition to those already mentioned. If critical machine components are monitored and replaced immediately when an abnormality occurs, the life of machine tools should increase due to the minimization of stress under high machine vibrations.

The health of bearings are crucial to the operation of machine tools and therefore, most vibration analysis programs have been initiated to monitor hearings. Ninety percent of bearing failures can be predicted months ahead, which provides more than adequate incentive for adopting monitoring and fault detection techniques for bearings.

The primary causes of bearing failures are: contamination, including moisture, overstress, lack of lubrication, and defects created after manufacturing. Bearings typically achieve only about 10 percent of their rated life. Tests of bearing life under laboratory conditions yield lives of 100 to 1000 years. Therefore, having the capability to determine the root cause of bearing failure is vital in preventing a recurrence of the problem and extending the life of the bearing.

Over the last two decades, most of the machine monitoring and diagnostic systems have been performed off-line using signal processing techniques. The success of these systems is not due to any one signal processing technique, but to the large amount of redundancy associated with multiple signal processing.

However, those signal processing techniques are very complicated to use; in addition, they must be performed by a highly trained and experienced human analyzer in order to make an accurate diagnosis. Accurate fault diagnostics is essential, especially in reducing product cycle time. As a result of correct and rapid fault diagnostics, equipment maintainability and availability can be improved significantly, thereby reducing the product cycle time.

Thus, what is needed is an effective machine monitoring technique for early detection of failure in critical machine components in order to prevent shutdowns and maintain production goals with high quality parts.

SUMMARY OF THE INVENTION

The present invention provides a system and method for monitoring and diagnosing a machine condition. The system and method includes collecting a first set of data from a machine during operation. The first set of data is indicative of the machine under normal machine conditions. An AR order is selected for the normal machine condition, and an AR model is generated from the first set of data collected from the machine. The AR model has a first order parameters ($\phi_{i1}$), second order parameters ($\phi_{i2}$), up to p order parameters ($\phi_{ip}$) for i=1, 2, . . . , n data sets.

An average value for the first order AR parameter through said pth order AR parameter from the AR model is calculated in order to define a normal model that is representative of the normal machine condition. Then, a second set of data is collected from a machine under diagnosis. The second set of data is representative of an current machine condition. The second set of data is fitted to the normal model to generate a fitted model, wherein the fitted model is an indicator of how closely the normal model fits the second set of data.

Forward and backward prediction errors are calculated to determine a $\rho_{normalized}^{fb}$ value for the second set of data. An exponentially weighted moving average (EWMA) statistic based on the $\rho_{normalized}^{fb}$ value is then calculated, wherein the EWMA statistic is an indicator of the overall machine condition. The EWMA statistic is compared to an upper control limit to determine if the machine under diagnosis is in a state of control or is a state of out-of-control. If the EWMA statistic exceeds the upper control limit this is a signal that an abnormal machine condition exists in the machine under diagnosis.

Furthermore, an EWMA control chart is generated based on experimental data that distinguishes between normal and abnormal conditions, and between different abnormal conditions. As an abnormal condition begins and worsens, the plot on the EWMA control chart is near a control limit and shows a trend towards the limit; eventually the EWMA control statistic extends well beyond the control limit if the abnormal condition is not corrected. The EWMA chart is divided into bands that represent specific abnormal bearing conditions. Thus, once the EWMA statistic is generated, it is compared to the EWMA chart for determination of the specific fault that is ailing the machine.

BRIEF DESCRIPTION OF THE FIGURES

The above and further advantages of this invention may be better understood by referring to the following description taken in conjunction with the accompanying drawings, in which:

FIG. 6 is a flowchart of a diagnosis and monitoring procedure that utilizes an exponentially weighted moving average.

FIG. 7 is an EWMA chart that illustrates three abnormal conditions.

FIG. 8 illustrates the three levels of fault diagnostics used by the present invention.

DETAILED DESCRIPTION OF THE PREFERRED EMBODIMENTS

1. Environment and Overview of the Invention

Figure 1:
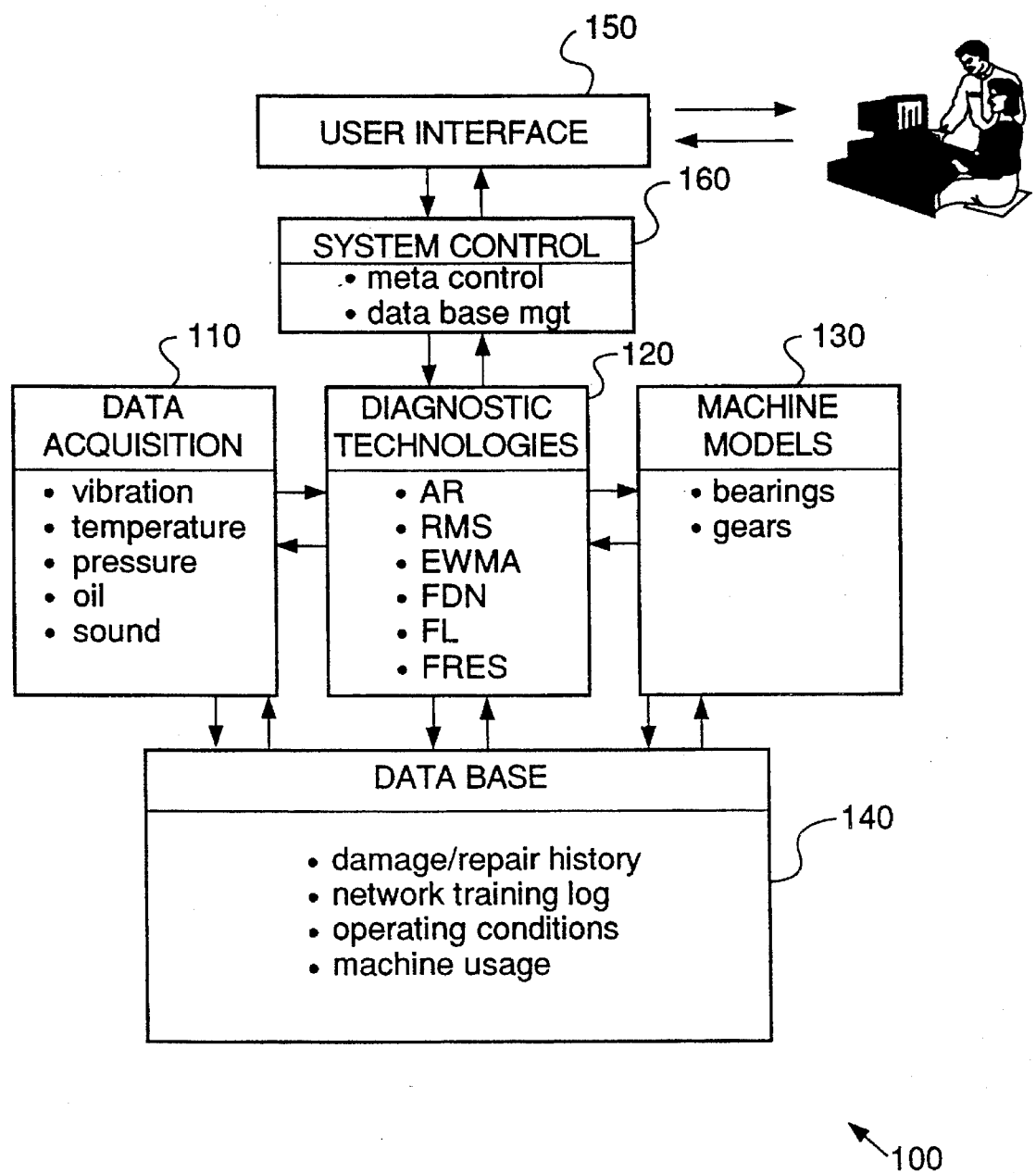
FIG. 1 shows a high level block diagram of an integrated machine monitoring diagnostic system.

FIG. 1 shows a high level block diagram of an integrated machine monitoring diagnostic system 100. The diagnostic system 100 is comprised of six modules: a data acquisition module 110, a diagnostic technologies module 120, a machine model module 130, a database module 140, a user interface 150, and a system control module 160.

Throughout the entire diagnostic procedure, the user is allowed to interact with the system via system control. Within this aspect of fault diagnostics, the user can override any diagnosis made by the system that contradicts the intuition of the experienced user. In addition, the user has the ability to enter relevant data into the vast database incorporated into the system. Having a systematic means of analyzing data is a significant benefit of any diagnostic system since many industries hold abundant amounts of data, yet have no useful method to interpret and apply this data to the system (machines) under study.

The data acquisition module 110 collects sensory signals, such as vibration, pressure, and temperature, from the machine. It consists of a number of sensors (e.g., accelerometers, acoustic emission sensors, pressure transducer, thermal couples, etc.) and data acquisition hardware and software programs for real-time data collection. Although vibration is the single best indicator of the condition of a machine, other information greatly enhances the ability to diagnose (see Wowk, V., Machinery Vibration: Measurement and Analysis, McGraw-Hill, Inc., 1991, pp. 69–73).

The diagnostic technology module 120 performs on-line fault detection, fault diagnostics and provides expert recommendations by employing a number of different technologies, such as parametric modeling, a neural network, fuzzy logic, and an expert system. The machine model module 130, including physical models for bearings and gears, provides data for preliminary training of the neural network on common bearing and gear faults. In addition, the machine model module 130 provide a deep fault reasoning mechanism to identify complex or multiple fault conditions.

The database module 140 contains important system information including damage or repair history, neural network training logs, operating conditions, and machine usage. The user interface model 150 provides a friendly environment for the user to interact with the system. Its function includes displaying machine status and information, accepting user's input, etc. The system control module 160 controls and coordinates the activities among modules. It also controls the database management activity.

Diagnostic system 100 preprocesses sensory inputs, such as vibration and sound, using an autoregressive (AR) model. Once the data is processed, the fault diagnostics can be carried out in three different levels, as shown in FIG. 8. At the fault detection level 810, indices based on an overall root mean square (RMS) measurement and a covariance statistic of an exponentially weighted moving average (EWMA) method are used to detect an abnormal machine condition on-line. (EWMA is described in Spoerre, J. K., "Machine Performance Monitoring and Fault Classification Using an Exponentially Moving Average Scheme," Masters Thesis, The University of Iowa, May 1993.) A control limit is set for each RMS or EWMA index. An abnormal condition is detected whenever the RMS or EWMA measurement of new sensory data exceeds a respective control limit. The sensory data are then transferred to the fault identification level 820 for further analysis. RMS is well known in the art and for the sake of brevity will not be described in detail herein.

The ability to effectively and efficiently detect abnormalities reflected in the vibration signal is crucial in machine condition monitoring. One method that can be used to describe the system and control the process is parametric modeling (e.g., through AR and EWMA techniques), which has the advantages of requiring only a short period of data for accurate analysis and exhibiting high resolution properties. Therefore, an abnormal condition is rapidly detected. In addition, a parametric spectrum has high resolution properties compared to an FFT spectrum, especially when limited data are available or when the signals are not stationary.

As such, the present invention uses a time series modeling approach. A characteristic of time series modeling is that the observed data is assumed to be the result of passing a white noise process through a digital filter. The filter's parameters, as well as the driving noise variance, are estimated so that the observed data is the closest fit to the data sequence the filter would generate if it was driven by white noise.

The process of filtering white noise is modeled using one of three methods autoregressive(AR), moving average (MA), or autoregressive moving average (ARMA) models.

The AR model is the most popular because many computationally efficient algorithms are available for estimating parameters, one of which will be introduced in the next section. Theoretically, an ARMA or MA process can be modeled by an AR model if an infinite-order model is used. In practice, reasonable-sized AR model can approximate ARMA and MA processes (see Jangi, S., et al., "Embedding spectra analysis in equipment," *IEEE Spectrum*, February 1991, pp. 40–43).

During normal operation of a bearing, a characteristic signal is present. Using autoregressive parameters, a model can be found that adequately describes the condition the system. At this time, the error term, at, in the model represents white noise. As the system changes, the vibration characteristics will also change. If the same parametric model used to describe the normal conditions is used to describe the new condition, the error term becomes inflated since it no longer represents only white noise. By tracking the variation in the error term, the occurrence of a bearing defect can be identified and the severity of the defect measured.

In a preferred embodiment, an exponentially weighted moving average (EWMA) control chart will record the condition of the system. The center line of the EWMA chart will be set at the variance calculated from the AR model for a normal bearing condition.

At the fault identification level 820, a fault diagnostic network (FDN) is employed to identify machine faults from the sensory data. Additional sensory data may be acquired in order to improve diagnostic accuracy. If the fault diagnostic network is not able to generate any hypothesis, a model-based reasoning approach will be applied to reason through the machine models to find possible faults. The fault reasoning of the machine models is accomplished by using the fuzzy logic (FL) methodology. The output of this reasoning process is identifiable faults and their possibilities.

At the level of verification and recommendations 830, all the identifiable faults are verified through a fault reasoning expert system (FRES). FRES checks the faults against its rules in the knowledge base, damage or repair history, and machine usage information to determine the most likely faults. Finally, recommendations for correcting the identified machine faults are provided by the FRES to the user. The user then can examine the machine according to the system's recommendations and store the diagnostic information in the database 140.

A more detailed description of the diagnostic system described above is given in U.S. Patent Application entitled "Machine Fault Diagnostics System and Method" which was cited above.

2. Theoretical Background and Modeling

A. Parametric Modeling Method

Figure 2:
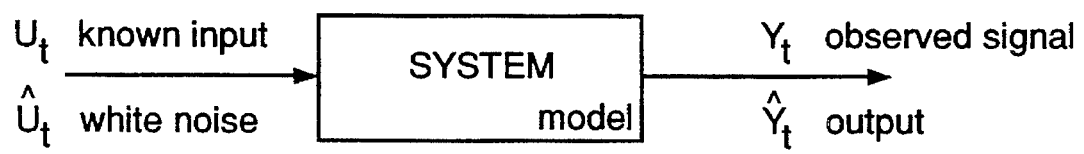
FIG. 2 illustrates a parametric modeling schematic that operates on incoming data or autocorrelation estimates.

Parametric modeling methods operate on incoming data or autocorrelation estimates to compute a set of parameters which correspond to an a priori model of the data statistic. This concept can be shown in FIG. 2, where the linear prediction of $y_t$ is $$\hat{y}_t = a_1 y_{t-1} + a_2 y_{t-2} + \ldots + a_p y_{t-p} \tag{1}$$

and p is the number of autoregressive parameters in the model.

B. Autoregressive Process

An autoregressive process is represented by a difference equation of the form:

$$X(n) = \sum_{i=1}^{p} \phi_i X(n-i) + e(n) \tag{2}$$

where $X(n)$ is the real random sequence, $\phi_i$, i=1,..., p are parameters, and $e(n)$ is a sequence of independent and identically distributed zero-mean Gaussian random variables with constant variance, that is, $$E\{e(n)\} = 0 \tag{3}$$

$$E\{e(n)e(j)\} = \begin{cases} \sigma^2 N, & \text{for } n = j \\ 0 & \text{for } n \neq j \end{cases} \tag{4}$$

$$f_{e(n)}(1) = \frac{1}{\sqrt{2\pi}\sigma_N} \exp\left\{ \frac{-\lambda^2}{2\sigma_N^2} \right\} \tag{5}$$

The sequence $e(n)$ is called white Gaussian noise. Thus, an autoregressive process is a linear difference equation model when the input or forcing function is white Gaussian noise (see Jangi, S., et al., "Embedding spectral analysis in equipment," *IEEE Spectrum*, February 1991, p. 42). Thus, for a machine operating under normal conditions, the vibration condition of the machine can be described by an AR process where the values of $e(n)$ are white Gaussian noise.

C. Model Validation

Figure 3:
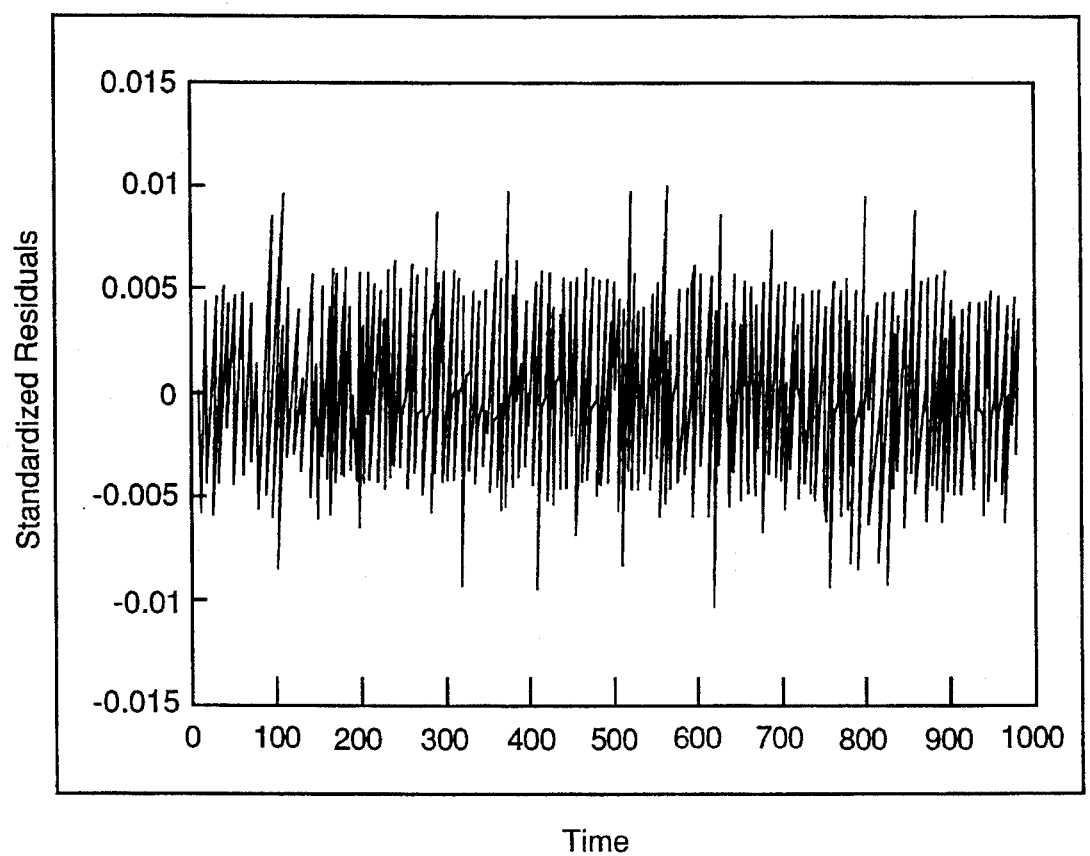
FIG. 3 illustrates a plot of the anticipated random distribution of residuals representing a normal machine condition.

If the model is suitable, the vibration signal will be defined to a large degree by the model and the deviations, or residuals, of the predicted signal from the actual signal for each point in time are distributed as white Gaussian noise and, therefore, randomly distributed about the mean value zero. If the stochastic component is white noise and the trend in the vibration signal is adequately modeled, a plot of the residuals over time is expected to exhibit a rectangular scatter plot with no discernible pattern, meaning the variance is constant. This anticipated random distribution of the residuals is apparent in the plot of the residuals over time for a set of data representing a normal machine condition, as shown in FIG. 3.

Gross nonnormality can be evaluated by plotting a histogram of the residuals. Since the errors are expected to be normally distributed, the histogram should closely resemble a normal distribution.

A final check for normality was conducted by calculating the normal scores of the residuals. The $t_{th}$ normal score is defined to be the $(t-3/8)/(n+1/4)$ percentage point of the standard normal distribution. With normally distributed data, a plot of the $t_{th}$ ordered data value (residual) versus the corresponding normal score should fall approximately on a straight line. This phenomenon occurs in the normal plot of a normal data set (see FIG. 3–4). Likewise, each of the other 7 data sets showed an approximate straight line in the plot of the standardized residuals vs normal scores.

D. Selecting AR Parameters

Determination of the AR parameters can be achieved by one of several techniques: Yule-walker method, Burg method, Covariance method, Modified Covariance method, etc. (see Marple, S., Digital Spectral Analysis with Applications, Prentice-Hall, Inc., 1987, pp. 224–231, 251). In a preferred embodiment, the modified covariance method is used since it eliminates problems encountered by using the other methods—frequency resolution, spectral line splitting, and bias of the frequency estimate (see Jangi, S., et al., "Embedding spectral analysis in equipment," *IEEE Spectrum*, February 1991, p. 42).

E. Selecting AR Order

Criteria used for the selection of the AR model order were final prediction error (FPE), Akaike information criteria (AIC), and criterion autoregressive transfer (CAT) function.

FPE selects the order of the AR process so that the average error variance for a onestep prediction is minimized, where the error variance is the sum of the power in the unpredictable part of the process and a quantity representing the inaccuracies in estimating the AR parameters. The FPE for an AR process is defined as follows:

$$FPE[p] = \hat{\rho}_p \left( \frac{N + (p+1)}{N - (p+1)} \right) \tag{6}$$

where N is the number of data samples, p is the order, and $\hat{\rho}_p$ is the estimated white noise variance.

The AIC determines the model order by minimizing an information theoretic function. Assuming the process has Gaussian statistics, the AIC for an AR process has the following form:

$$AIC[p] = N \ln(\hat{\rho}_p) + 2p \tag{7}$$

A final criterion, CAT, selects the order p as that which minimizes the estimate of e difference between mean square errors of the true prediction error filter and the estimated filter. This difference is calculated from the following equation:

$$CAT[p] = \left( \frac{1}{n} \sum_{j=1}^{p} \overline{\rho}_j^{-1} \right) - \overline{\rho}_p^{-1} \tag{8}$$

where $\overline{\rho}_j = [N/(N-j)]\hat{\rho}_j$ and p is chosen to minimize CAT[p].

F. Modified Covariance Method

The pth-order forward and backward linear prediction errors for the modified covariance method may be represented as the vector inner products $$e_p^f[n] = x_p^T[n] a_p^{fb}[n] \tag{9}$$

$$e_p^b[n] = x_p^T[n] J a_p^{fb}, \tag{3.6.2}$$

where the data vector $x_p[n]$ and linear prediction coefficient vector $a_p^{fb}$ are defined as follows:

$$x_p[n] = \begin{pmatrix} x[n] \\ x[n-1] \\ \cdot \\ \cdot \\ \cdot \\ x[n-p] \end{pmatrix}, a_p^{fb} = \begin{pmatrix} 1 \\ a_p[1] \\ \cdot \\ \cdot \\ \cdot \\ a_p[p] \end{pmatrix} \quad (11)$$

and J is a $(p+1) \times (p+1)$ reflection matrix. Based on measured data samples $x[1], \ldots, x[N]$, the modified covariance method minimizes the average of the forward and backward linear prediction squared errors.

$$\rho^{fb} = \frac{1}{2} \left[ \sum_{n=p+1}^{N} [|e_p^f[n]|^2 + |e_p^b[n]|^2] \right] \quad (12)$$

G. Exponentially Weighted Moving Average (i) Control Statistic

The exponentially weighted moving average (EWMA) control statistic is defined as follows:

$$EWMA_t = \max\{(1-\lambda)EWMA_{t-1} \lambda \ln[\rho_{normalized}^{fb}], 0\} \quad (13)$$

where $EWMA_0 = 0$ $EWMA_t$=predicted EWMA value at time t (new EWMA)

$EWMA_{t-1}$=predicted EWMA value at time t-1 (old EWMA)

$\ln[\rho_{normalized}^{fb}]$ is the sample variance of observed values at time t $\lambda$ is a smoothing constant satisfying $0<\lambda<1$ that determines the depth of memory of the EWMA (ii) Weighting Constant The EWMA can be written as:

$$y_{t+1} = \sum_{i=0}^{t} w_i y_i \quad (14)$$

where the $w_i$ are weights and $w_i = \lambda(1-\lambda)^{t-1}$.

The sum of the weights $$\sum_{i=0}^{t} w_i = 1.$$

The constant $\lambda$ determines the "memory" of the EWMA statistic. That is, $\lambda$ determines the rate of decay of the weights and in turn, the amount of information recollected from the past data. As $\lambda$ approaches 1, $w_1$ approaches 1 and $\hat{y}_{t+1}$ is nearly equivalent to the most recent observation $y_t$. On the other hand, as $\lambda$ approaches 0, the most recent observation has small weight and previous observations nearly equal weights.

(iii) Upper Control Limit

The upper control limit for the EWMA statistic is $$UCL = \mu_{\rho^{fb}} + 4\sigma_{\rho^{fb}} \quad (15)$$

where $$\mu_{\rho^{fb}} = \frac{1}{n} \sum_{i=1}^{n} \mu_{\rho_i^{fb}}, \quad (16)$$

$$\sigma_{\rho^{fb}} = \sqrt{\frac{1}{n-1} \sum_{i=1}^{n} \rho_i^{fb} - \mu_{\rho_i^{fb}}}, \quad (17)$$

and n=number of data sets initially collected under a normal machine condition.

(iv) EWMA Characteristics

The EWMA is a statistic with the characteristic that it gives less and less weight to data as it becomes older and older.

The EWMA chart was chosen since it has been proven superior to the range chart or $s^2$ in terms of its ability to quickly detect small percent increases in the process standard deviation (see Crowder, S., et al., *Journal of Quality Technology* 24(1): 12–21 (1992)). In addition, the EWMA is easy to plot, easy to interpret, and its control limits are easy to obtain. A major advantage of employing EWMA is that it provides a mechanism for dynamic process control.

To control a process it is convenient to forecast where the process will be in the next instance of time. Then, if the forecast shows a future deviation from target that is too large, some electromechanical control system or process operator can take remedial action to compel the forecast to equal the target. In manufacturing, a forecast based on the unfolding historical record can be used to initiate a feedback control loop to adjust the process (see Box, G., et al., Statistic for Experimenters, John Wiley & Sons, New York, N.Y., 1978).

Lambda ($\lambda$) determines the "memory" of the EWMA statistic; that is, $\lambda$ determines the rate of decay of the weight and hence, the amount of information secured from the historical data. The choice of l is somewhat arbitrary and was experimentally chosen to provide the smallest predicted variance (error) with a value of 0.7.

From Equations (13), it can be seen that the logarithmic scale is used. The meaningful presentation of vibration data is essential in order to enable a diagnostician to accurately determine the true condition of a machine. The use of a logarithmic scale provides a representation closer to the vibrational behavior of machines (see Archambault, R., "Getting More Out of Vibration Signals: using the logarithmic scale," *Proceedings of the 1st International Machinery Monitoring and Diagnostics Conference*, Las Vegas, Nev., 1989, pp. 567–571). It has been recommended that the log of the sample variances should be used when making inferences about variances of normally distributed data (see Box, G., et al., Statistic for Experimenters, John Wiley & Sons, New York, N.Y., 1978). One reason is that the logs of the sample variances will be much more normally distributed than the sample variances themselves. Also, the variance of $\ln(\rho^{fb})$ is independent of $s^2$ and depends only on the sample size n.

An increase in $s^2$ corresponds to an increase in the location parameter of the log-gamma distribution (the distribution of $\ln(\rho^{fb})$). Thus, an increase in the underlying process standard deviation should cause an increase in the mean level of the plotted EWMA values. Because of its simplicity and the properties listed above, the log transformation is considered to be an appropriate transformation. Since vibration signals collected on rotating machinery can be very complex, as the vibration signal measured at a given point on the machine is the sum of all the internal forces applied to the machine modified by their respective transmission paths, the logarithmic scale provides a large range on which to display all the relevant data (see Archambault, R., "Getting More Out of Vibration Signals: using the logarithmic scale," *Proceedings of the 1st International Machinery Monitoring and Diagnostics Conference*, Las Vegas, Nev., 1989, pp. 567–571].

3. Detailed Operational Description

Figure 4:
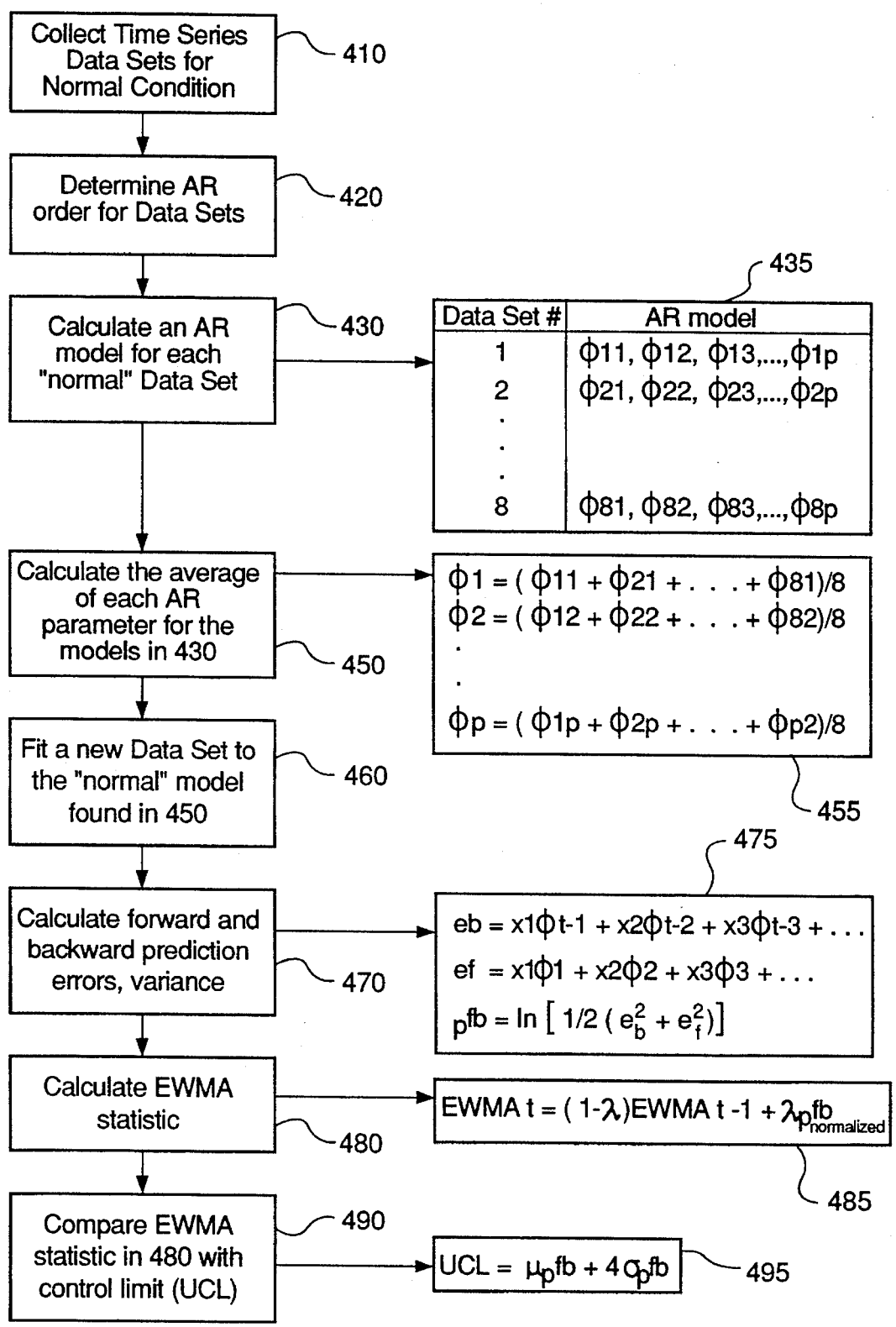
FIG. 4 is a detailed flowchart of the methodology used to calculate an EWMA in accordance with the present invention.

FIG. 4 is a detailed flowchart of the methodology used to calculate the EWMA in accordance with the present invention. That is, it outlines a methodology for monitoring and diagnosing a machine condition. Initially, time series data (e.g., vibration signals) is collected from a physical machine (in a lab setup) under normal machine conditions, as shown in block 410. In a preferred embodiment, each of the data sets consists of 1000 data points. Note that the present invention is not limited to machine conditions, and can be extended to processes as would be apparent to a person skilled in the relevant art.

Data collection is conducted using the following setup: a DC motor connected to a shaft by a drive belt, two cylindrical pillow block bearings mounted on each end of the shaft and secured to a steel plate, an oscilloscope to display the raw vibration signal collected, an amplifier to magnify the signal, and a DT2821-G-8DI data acquisition board. Vibration signals were collected from the bearing using 328CO4 PCB accelerometers mounted on the bearing housing.

Figure 5:
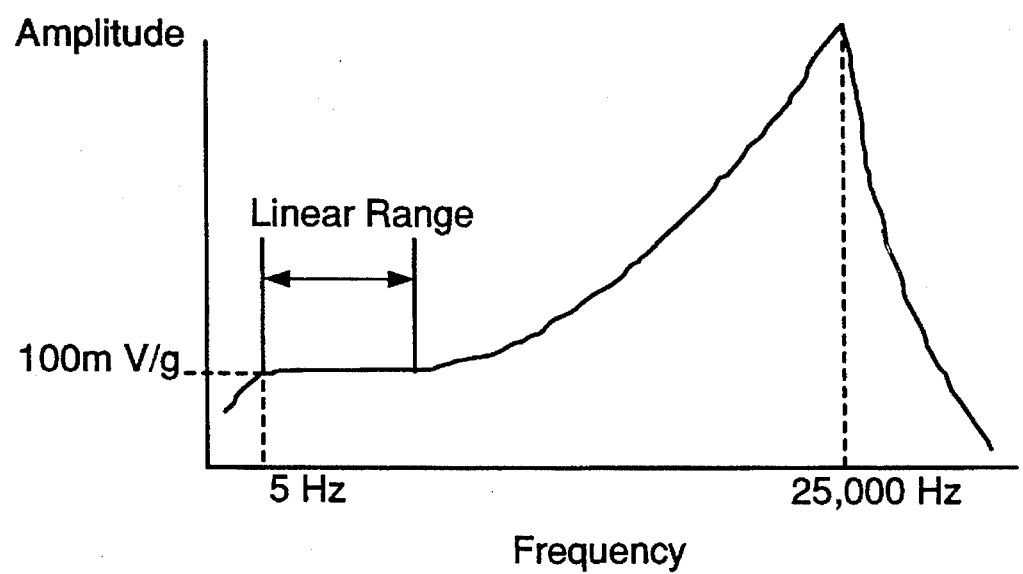
FIG. 5 displays the sensitivity response (amplitude) of an accelerometer versus frequencies.

Accelerometers are transducers whose voltage output is proportional to acceleration or, as a more useful description, the internal forces in the machine. If the acceleration level is high, then the internal forces are high. Forces are the cause of oscillation, in addition to excessive wear and premature failure. The sensitivity response (amplitude) of an accelerometer versus frequencies is displayed in FIG. 5.

Accelerometers are the preferred transducers in machine condition monitoring due to the following reasons: extreme ruggedness, large frequency response, large dynamic range—accelerometers can detect very small vibrations without being damaged by large vibrations, output is proportional to forces which are the cause of internal damage, and high-frequency sensitivity for detecting bearing faults.

Next, an appropriate AR model (i.e., one that adequately describes the vibration data being collected) is selected using the criteria defined in Equations (6), (7), and (8). As shown in block 420, a suitable AR order is then chosen. After choosing a suitable AR order for the normal condition, an AR model is generated for each of the data sets collected under the normal machine condition, i.e., first order parameters ($\phi_{i1}$), second order parameters ($\phi_{i2}$), up to p order parameters ($\phi_{ip}$) for i=1, 2, . . . , n data sets, as shown in blocks 430 and 435.

As shown in blocks 450 and 455, an average value is calculated for the first order AR parameter through the pth order AR parameter from the AR models generated in blocks 430 and 435. This calculation is performed in order to define a model that would be representative of a normal machine condition under the conditions defined in the lab setup.

Once the model is established for the normal machine condition, new data is collected for an abnormal machine condition. Then the abnormal vibration signals are fit to the "normal" model found in block 450 and 455 as an indicator of how closely the normal model fits the data set collected under the current condition. This step is represented in block 460.

In order to measure the fit of the data to the normal model, forward and backward prediction errors are calculated to determine the $\rho_{normalized}^{fb}$ value of the data, as shown in blocks 470 and 475. This process is described above in section 2(F) (i.e., modified covariance method). The normalization is based on the normal machine condition since the purpose of the present invention is to be able to detect any deviations from the normal machine condition. Normalization is utilized to uncover all possible collections or sets containing the same data and allows current and previous data for a machine to be superimposed, regardless of the operating speed. In addition, normalization allows the creation of an average data file for each specific machine type.

Vibration signatures for many identical machines taken at different times at slightly different operating speeds can be accumulated statistically and represented by a single set of averaged narrow band spectra (see Watts, W., et al., "A Portable, Automated Machine Condition Diagnostics Program Using Order Normalized Vibration Data," *Proceedings of the 1st International Machinery Monitoring and Diagnostics Conference*, Las Vegas, Nevada, 1989, pp. 637–643). To determine whether the vibration signature of a machine is significant, the current condition is compared to the normal condition through the $\rho^{fb}$ values.

Given the $\rho^{fb}$ value found in blocks 470 and 475, an exponentially weighted moving average (EWMA) statistic is calculated, with λ=0.7, as shown in block 480. The calculated EWMA statistic is an indicator of the overall machine condition and is compared to the upper control limit (UCL) (describe above in section 2(G)(iii)) to determine if the machine is in a state of control or if it is out-of-control. This step is shown in blocks 490 and 495. If the EWMA value exceeds the UCL, this is a signal that an abnormal machine condition exists and action should be taken.

4. Data Analysis

The following description is the result of applying the above described invention to an actual machine in a lab setting. Although different data sets will result in a slightly different outcome, the principles and methodology described herein remain the same. After collecting data from the machine, the modified covariance method and the three methods described above are used to determine the appropriate AR model to adequately describe the normal machine condition. In a preferred embodiment, the most suitable order for the AR model is 33, resulting in a ratio of AR order to sequence length (1000) of 0.033. The value is preferably small since frequency bias and line splitting increase with an increasing ratio of AR order to sequence length.

In a preferred embodiment, once the normal model is established for the normal condition, vibration data is collected under three abnormal operating conditions, namely misaligned shaft, loose bearing, and contaminated bearing.

For each data set collected under one of the four conditions, the minimum and maximum variances were determined, as shown in Table 1. These variances were normalized by dividing the variance by the average variance under a normal condition (0.0000048582) and taking the natural log of the variance for both the minimum and maximum variances for each machine condition. The variance values were used to determine the upper and lower bounds of the EWMA, as shown in Table 2.

The numbers in the upper portion of each cell in Table 2 represent the minimum and maximum observed EWMA statistic based on actual data collected in the lab. The numbers in the lower portion of the cell are based on statistics of the collected data and were calculated using $\mu_{\rho}^{fb} - 4\sigma_{\rho}^{fb}$ for the lower bound and $\mu_{\rho}^{fb} - 4\sigma_{\rho}^{fb}$ for the upper bound, where $\mu_{\rho}^{fb}$ is the average value for the EWMA statistic for each machine condition, i.e., $$\mu_{\rho}{}^{fb} = \frac{1}{n} \left[ \sum_{i=1}^{n} \rho_i^{fb} \right],$$

where n is the number of samples collected.

The standard deviation, as well as $\mu_{\rho}^{fb}$, was determined for each bearing condition. Standard deviations are calculated by the following formula:

$$\sigma_{\rho^{fb}} = \sqrt{\frac{1}{n}\left[\sum_{i=1}^{n}(\rho_i^{fb}-\mu_{\rho^{fb}})^2\right]}$$

In Table 2, the upper and lower bound of EWMA values for the abnormal conditions (misalignment, contamination, and looseness) are calculated based on the minimum and maximum EWMA statistic calculated for the normal condition and the variances of the abnormal conditions in Table 1. For example, under the normal condition, the minimum and maximum EWMA values for all eight data sets collected was 0.000000 and 0.126535, consecutively. Referring to Equation (13), the EWMA statistic is calculated by $$EWMA_t = max\{(1-\lambda)EWMA_{t-1} + \lambda ln\ \rho_{normalized}^{fb}, 0\}$$

TABLE 1

Calculated "Normalized" Variances for a Normal Machine Condition and Three Abnormal Machine Conditions

| | Statistic | |
|---|---|---|
| Condition | Average value $\mu_{\rho^{fb}}$ | Standard deviation $\sigma_{\rho^{fb}}$ |
| normal | 0.100081 | 0.124959 |
| misalignment | 2.561171 | 0.116305 |
| contamination | 5.002439 | 0.302079 |
| looseness | 3.449739 | 0.125359 |

Under a misalignment condition, for example, the minimum EWMA statistic that could occur is calculated using the minimum variance found under a misalignment condition and the minimum EWMA statistic for the normal condition. Similarly, the maximum EWMA statistic that could occur is calculated using the maximum variance found under a misalignment condition and the maximum EWMA statistic for the normal condition. In the following calculations below, it is shown how the values in Table 2 were determined using the statistics from Table 1.

TABLE 2

Calculated EWMA Statistics for a Normal Machine Condition and Three Abnormal Machine Conditions

| | EWMA Statistic: | |
|---|---|---|
| Condition | Lower Bound | Upper Bound |
| normal | 0.000000 | 0.134323 |
| | (0.000000) | (0.496657) |
| misalignment | 1.165905 | 1.315764 |
| | (1.072859) | (1.501256) |
| contamination | 2.283083 | 2.487441 |
| | (2.201966) | (2.709934) |
| looseness | 1.835429 | 1.975226 |
| | (1.740603) | (2.162600) |

For a normal condition:
The lower bound for the EWMA statistic is as follows:

$$LB_{normal} = [ln(min\rho_{normal}^{fb})][0.7] = 0.0000000$$

The upper bound for the EWMA statistic is:

$$UB_{normal} = [ln(max\rho_{normal}^{fb})][0.7] = 0.134323$$

For a misaligned condition:
The lower bound for the EWMA statistic is:

$$\begin{aligned} LB_{misalignment} &= (1-\lambda)EWMA_{LB(normal)} + \\ &\quad \lambda(min\ \rho_{misalignment}^{fb})] \\ &= (0.3)(0.000000) + (0.7)(1.665578) \\ &= 1.165905 \end{aligned}$$

The upper bound for the EWMA statistic is:

$$\begin{aligned} UB_{misalignment} &= (1-\lambda)EWMA_{UB(normal)} + \\ &\quad \lambda(max\ \rho_{misalignment}^{fb})] \\ &= (0.3)(0.134323) + (0.7)(1.822096) \\ &= 1.315764 \end{aligned}$$

For a contaminated condition:
The lower bound for the EWMA statistic is:

$$\begin{aligned} Lb_{contaminated} &= (1-\lambda)EWMA_{LB(normal)} + \\ &\quad \lambda(min\ \rho_{contaminated}^{fb})] \\ &= (0.3)(0.000000) + (0.7)(3.261547) \\ &= 2.283083 \end{aligned}$$

The upper bound for the EWMA statistic is:

$$\begin{aligned} UB_{contaminated} &= (1-\lambda)EWMA_{UB(normal)} + \\ &\quad \lambda(max\ \rho_{contaminated}^{fb})] \\ &= (0.3)(0.134323) + (0.7)(3.495920) \\ &= 2.487441 \end{aligned}$$

For a loose condition:
The lower bound for the EWMA statistic is:

$$\begin{aligned} LB_{loose} &= (1-\lambda)EWMA_{LB(normal)} + \lambda(min\ \rho_{loose}^{fb})] \\ &= (0.3)(0.000000) + (0.7)(2.622042) \\ &= 1.835429 \end{aligned}$$

The upper bound for the EWMA statistic is:

$$\begin{aligned} UB_{loose} &= (1-\lambda)EWMA_{UB(normal)} + \lambda(max\ \rho_{loose}^{fb})] \\ &= (0.3)(0.134323) + (0.7)(2.764185) \\ &= 1.975226 \end{aligned}$$

In Table 2, the numbers in parenthesis are determined based on the equations given below:

(1) Minimum normalized variance = $\mu_{\rho^{fb}} - 4\sigma_{\rho^{fb}}$
(2) Maximum normalized variance = $\mu_{\rho^{fb}} + 4\sigma_{\rho^{fb}}$ where the minimum and maximum normalized variances, average normalized variances and standard deviation of normalized variances for each machine condition are found in Table 1.

To determine the upper and lower bounds of the EWMA values for each machine condition under the 4σ limits, the following equation is used for each machine condition:

$$EWMA_{min} = (0.3)(EWMA_{min(norm)}) + (0.7)(lower\ 4\sigma\ normalized\ variance)$$

$$EWMA_{min} = (0.3)(EWMA_{min(norm)}) + (0.7)(upper\ 4\sigma\ normalized\ variance)$$

The second set of upper and lower bounds, based on 4σ limits, were calculated as follows (see Table 3):

For a normal condition:
The 4σ lower bound for the EWMA statistic is as follows:

$$LB_{normal} = [Min\ \rho^{fb}_{normal}][0.3]$$
$$= \mu_{\rho^{fb}_{normal}} + 4\sigma_{\rho^{fb}_{normal}}$$
$$= (0.00)(0.3) = 0.000000$$

The 4σ upper bound for the EWMA statistic is as follows:

$$UB_{normal} = [Max\ \rho^{fb}_{normal}][0.7]$$
$$= \mu_{\rho^{fb}_{normal}} + 4\sigma_{\rho^{fb}_{normal}}(0.7)$$
$$= [0.00357 + 4(0.17827)](0.7) = 0.496657$$

For a misaligned condition:
The 4σ lower bound for the EWMA statistic is $$LB_{misalignment} = (1-\lambda)(Min\ \rho^{fb}_{normal}) + \lambda(Min\ \rho^{fb}_{misalignment})$$
$$= (0.3)(0.00) + (0.7)(\mu_{\rho^{fb}_{misalignment}} - 4\sigma_{\rho^{fb}_{misalignment}})$$
$$= (0.00) + (0.7)(1.732227 - 4(0.049893))$$
$$= 1.072859$$

The 4σ upper bound for the EWMA statistic is $$LB_{misalignment} = (1-\lambda)(Max\ \rho^{fb}_{normal}) + \lambda(Max\ \rho^{fb}_{misalignment})$$
$$= (0.3)(0.496657) +$$
$$(0.7)(\mu_{\rho^{fb}_{misalignment}} - 4\sigma_{\rho^{fb}_{misalignment}})$$
$$= (0.3)(0.496657) + (0.7)(1.732227 - 4(0.049893))$$
$$= 1.501256$$

For a contaminated condition:
The 4σ lower bound for the EWMA statistic is $$LB_{contaminated} = (1-\lambda)(Min\ \rho^{fb}_{normal}) + \lambda(Min\ \rho^{fb}_{contaminated})$$
$$= (0.3)(0.00) + (0.7)(\mu_{\rho^{fb}_{contaminated}} - 4\sigma_{\rho^{fb}_{contaminated}})$$
$$= (0.3)(0.00) + (0.7)(3.402073 - 4(0.064102))$$
$$= 2.201966$$

The 4σ upper bound for the EWMA statistic is
For a loose condition:
The 4σ lower bound for the EWMA statistic is
The 4σ upper bound for the EWMA statistic is $$UB_{contaminated} = (1-\lambda)(Max\ \rho^{fb}_{normal}) + \lambda(Max\ \rho^{fb}_{contaminated})$$
$$= (0.3)(0.496657) +$$
$$(0.7)(\mu_{\rho^{fb}_{contaminated}} - 4\sigma_{\rho^{fb}_{contaminated}})$$
$$= (0.3)(0.496657) + (0.7)(3.402073 - 4(0.064102))$$
$$= 2.709934$$

$$LB_{loose} = (1-\lambda)(Min\ \rho^{fb}_{normal}) + \lambda(Min\ \rho^{fb}_{loose})$$
$$= (0.3)(0.000000) + (0.7)(\mu_{\rho^{fb}_{loose}} - 4\sigma_{\rho^{fb}_{loose}})$$
$$= (0.3)(0.000000) + (0.7)(2.681575 - 4(0.048750))$$
$$= 1.740603$$

$$UB_{loose} = (1-\lambda)(Max\ \rho^{fb}_{normal}) + \lambda(Max\ \rho^{fb}_{loose})$$
$$= (0.3)(0.496657) + (0.7)(\mu_{\rho^{fb}_{loose}} - 4\sigma_{\rho^{fb}_{loose}})$$
$$= (0.3)(0.496657) + (0.7)(2.681575 - 4(0.048750))$$
$$= 2.162600$$

The percentage of the data sets that will have a calculated normalized variance within the range of normalized variances found under initial experimentation is determined by calculating the probability that the normalized values for each machine condition will lie within the range (maximum normalized variance—minimum normalized variance). This probability is calculated by:

$$P(a < X < b) = \phi\left(\frac{b-\bar{x}}{\sigma}\right) - \phi\left(\frac{a-\bar{x}}{\sigma}\right)$$

where a is the minimum normalized variance (min $\rho^{fb}_{normalized}$), b is the maximum normalized variance (max $\rho^{fb}_{normalized}$), $\bar{x}$ is the average normalized variance (normalized $\sigma_{\rho^{fb}}$) (see Table 1).
For a normal condition:

$$P(\bar{x} \leq 0.19189) = \phi\left(\frac{0.19189 + 0.00357}{0.17827}\right) -$$
$$= \phi(1.096) = 0.86355$$

For a misaligned condition:

$$P(1.665578 \leq \bar{x} \leq 1.822096) = \phi\left(\frac{1.822096 - 1.732227}{0.049893}\right) -$$
$$\phi\left(\frac{1.665578 - 1.732227}{0.049893}\right)$$
$$= 0.87337$$

For a contaminated condition:

$$P(3.261547 \leq \bar{x} \leq 3.495920) = \phi\left(\frac{3.495920 - 3.402073}{0.064102}\right) -$$
$$\phi\left(\frac{3.261547 - 3.402078}{0.064102}\right)$$
$$= 0.91423$$

For a loose condition:

$$P(2.622042 \leq \bar{x} \leq 2.764185) = \phi\left(\frac{2.764185 - 2.681575}{0.048750}\right) -$$
$$\phi\left(\frac{2.622042 - 2.681575}{0.048750}\right)$$
$$= 0.84391$$

TABLE 3

Calculated Statistics of EWMA Values for a Normal Machine Condition and Three Abnormal Machine Conditions

| | Statistic | |
|---|---|---|
| Condition | Minimum EWMA | Maximum EWMA |
| Normal | 0.0000 | 0.4967 |
| Misalignment | 1.0729 | 1.5013 |
| Contamination | 2.2020 | 2.7099 |
| Looseness | 1.7406 | 2.1626 |

Replacing the minimum and maximum normalized variances by the 4s limits will increase the probability that the normalized variance for a particular machine condition will lie within the calculated variance range. Limits of 4s give a 99% probability that the data will lie within those 4s boundaries. Although the lower control limits is not used in a preferred embodiment of the present invention—the exponentially weighted moving average statistic—an assumption is made that the variance will never be less than 0 when an abnormal condition occurs. Using the 4s range for each machine condition, with the average normalized variances and standard deviation of normalized variances shown in Table 1, the 99% probabilities are calculated below:

For a normal condition:

$$P(\bar{x} \leq 0.70951) = \phi\left(\frac{0.70951 + 0.00357}{0.17827}\right)$$
$$= \phi(4) = 0.99997$$

For a misaligned condition:

$$P(1.532655 \leq \bar{x} \leq 0.70951) = \phi\left(\frac{1.931799 - 1.732227}{0.049893}\right) -$$
$$\phi\left(\frac{1.532655 - 1.732227}{0.049893}\right)$$
$$= 0.99994$$

For a contaminated condition:

$$P(3.145665 \leq \bar{x} \leq 3.658481) = \phi\left(\frac{3.658481 - 3.402073}{0.064102}\right) -$$
$$\phi\left(\frac{3.145665 - 3.402073}{0.064102}\right)$$
$$= 0.99994$$

For a loose condition:

$$P(2.486575 \leq \bar{x} \leq 2.876575) = \phi\left(\frac{2.876575 - 2.681575}{0.048750}\right) -$$
$$\phi\left(\frac{2.486575 - 2.681575}{0.048750}\right)$$
$$= 0.99994$$

The range of values for each of the operating conditions given above were well-defined with no overlap among different machine conditions. FIG. 6 illustrates a diagnosis and monitoring procedure that uses the EWMA technology. Initially, the EWMA statistic is set to 0.0, as shown in block 605. Then, using the procedure outlined above, the EWMA statistic is calculated, as shown in block 610. Next, the EWMA statistic is checked against a "normal condition" upper limit, which in the example given above is 0.4967.

If the EWMA statistic falls below this upper limit then the machine is operating normally, as shown in block 620. In this scenario the procedure flows back to block 610. However, if the EWMA statistic falls above the upper limit then a potential abnormal condition exists, as shown in block 630. Based on table 2, blocks 640, 650, and 660, each indicate a different abnormal condition. Namely, if the EWMA statistic falls between 1.1 and 1.5 then the abnormal condition is misalignment; if the EWMA statistic falls between 1.7 and 2.2 then the abnormal condition is loose bearings; and if the EWMA statistic falls between 2.2 and 2.7 then the abnormal condition is contamination. Of course other abnormal conditions can be detected by following the above procedure and determining the appropriate EWMA statistic.

Once the abnormal condition is detected, the procedure 600 prints via the user interface 150 the detected fault, as shown in blocks 670, 680, and 690. At this time, an operator corrects the problem with the machine, as shown in block 695, and the EWMA statistic reset to 0.0 (i.e., normal condition).

FIG. 7 illustrates an EWMA chart. The EWMA chart can be divided into bands 710–740 that represent the location of specific machine conditions. A normal condition is shown in band 740, while the abnormal machine conditions are shown in bands 710–730.

By developing an AR parametric model to characterize the normal machine condition, the EWMA control statistic is able to identify whether the machine is in a normal state ("in control") or in an abnormal state ("out of control"). As an abnormal bearing condition begins and worsens, the plot on the EWMA control chart is near the control limit and shows a trend towards the limit; eventually the EWMA control statistic extends well beyond the control limit if the abnormal condition is not corrected.

It has also been determined that there is a positive correlation between the average amplitude of the signal and the average EWMA statistic for a given machine condition. As the average amplitude increases, the EWMA value increases. This implies that the EWMA statistic is sensitive to changes in amplitude. Since an increase in amplitude occurs when a bearing or other machine component undergoes the initial stages of failure, the EWMA technique has the ability to detect small changes in amplitude once a defect occurs.

Furthermore, it has been shown that the deviation of the variance at time t from the variance established under a normal condition is an indicator of current bearing condition. If this deviation is nearly zero, the bearing is operating in a normal condition; however, if this value is significantly different from zero, an out of coil state exists and corrective action is necessary.

While the invention has been particularly shown and described with reference to preferred embodiments thereof, it will be understood by those skilled in the art that various changes in form and details may be made therein without departing from the spirit and scope of the invention.

What is claimed is:

1. A computer-based method for monitoring and diagnosing an abnormal machine condition, comprising the steps of:

(1) operating a machine under normal machine conditions;

(2) defining a parametric model for said machine operating under said normal machine condition;

(3) calculating an Exponentially Weighted Moving Average (EWMA) statistic based on prediction errors generated in fitting abnormal vibration signals to said parametric model; and (4) comparing said EWMA statistic to a limit, wherein if said EWMA statistic is above said limit said machine is operating abnormally.

2. The computer-based method of claim 1, further comprising the step of comparing said EWMA statistic to different values in a chart to determine a specific abnormal condition affecting said machine.

3. A computer-based method for monitoring and diagnosing a machine condition, comprising the steps of:

(1) operating a machine under normal machine conditions;

(2) collecting a first set of data from said machine, wherein said first set of data is indicative of the operation of said machine under said normal machine conditions;

(3) selecting an AR order for said normal machine condition, and generating an AR model for said first set of data, wherein said AR model has a first order parameters ($\phi_{i1}$), second order parameters ($\phi_{i2}$), up to p order parameters ($\phi_{ip}$) for i=1, 2, . . . , n data sets;

(4) calculating an average value for said first order AR parameter through said pth order AR parameter from said AR models in order to define a normal model that is representative of said normal machine condition;

(5) collecting a second set of data from a machine under diagnosis, wherein said second set of data is representative of an abnormal machine condition;

(6) fitting said second set of data representative of said abnormal machine condition to said normal model to generate a fitted model, wherein said fitted model is an indicator of how closely said normal model fits said second set of data;

(7) calculating forward and backward prediction errors to determine a $\rho_{normalized}^{fb}$ value for said second set of data;

(8) calculating an exponentially weighted moving average (EWMA) statistic based on said $\rho_{normalized}^{fb}$ value, wherein said EWMA statistic is an indicator of the overall machine condition;

(9) comparing said EWMA statistic to an upper control limit to determine if said machine under diagnosis is in a state of control or is a state of out-of-control, wherein if said EWMA statistic exceeds said upper control limit this is a signal that an abnormal machine condition exists in said machine under diagnosis.

4. The computer-based method of claim 3, further comprising the step of determining an appropriate AR model using a modified covariance method, final prediction error, Akaike information criteria, and criterion autoregressive transfer function, wherein said AR model adequately describes a normal machine condition.

5. The computer-based method of claim 3, wherein said EWMA is calculated with $\lambda=0.7$.

* * * * *